United States Patent [19]
Shintani

[11] Patent Number: 5,668,591
[45] Date of Patent: Sep. 16, 1997

[54] INFORMATION TERMINAL APPARATUS THAT IS REMOTELY PROGRAMMED BY RADIO WAVES AND THAT DISPLAYS INPUT KEYS OF PROGRAM FUNCTIONS ON A DISPLAY

[75] Inventor: Peter Shintani, Tokyo, Japan

[73] Assignee: Sony Corporation, Tokyo, Japan

[21] Appl. No.: 412,950

[22] Filed: Mar. 29, 1995

[30] Foreign Application Priority Data

Mar. 30, 1994 [JP] Japan ................................. 6-085704

[51] Int. Cl.$^6$ ................................................. H04N 7/173
[52] U.S. Cl. ........................... 348/12; 348/13; 348/734
[58] Field of Search ..................... 348/12, 13, 7, 348/734, 6; 345/2; 455/4.1, 4.2, 5.1, 6.3, 352; 364/410, 411, 412, 400; H04N 5/00, 7/10, 7/14, 7/173

[56] References Cited

U.S. PATENT DOCUMENTS

| | | |
|---|---|---|
| 4,626,848 | 12/1986 | Ehlers . |
| 4,802,114 | 1/1989 | Sogame . |
| 5,410,326 | 4/1995 | Goldstein ................... 348/734 |
| 5,519,433 | 5/1996 | Lappington et al. ............ 348/13 |

FOREIGN PATENT DOCUMENTS

| | | |
|---|---|---|
| 2251504 | 7/1992 | United Kingdom . |
| 2275800 | 9/1994 | United Kingdom . |

*Primary Examiner*—David E. Harvey
*Attorney, Agent, or Firm*—Jay H. Maioli

[57] ABSTRACT

An information terminal apparatus capable of ensuring enhanced operational facility and realizing easier maintenance of software required for a variety of services. The terminal apparatus includes an external information input port for receiving external software transmitted thereto by radio waves; a first memory for storing the software received by the external information input port; a first controller operated in accordance with the execution of the software stored in the first memory; a console for inputting predetermined data in conformity with the execution of the software; and a display for visually representing various kinds of information in conformity with the execution of the software. The software is obtained via a cable box for transferring a signal to or from the information terminal unit. The cable box includes an interface for transferring information to and from a host processor; a second memory for storing the software transmitted thereto from the host processor; and a second controller for controlling the signal transfer to or from the interface, the second memory and the information terminal unit.

9 Claims, 6 Drawing Sheets

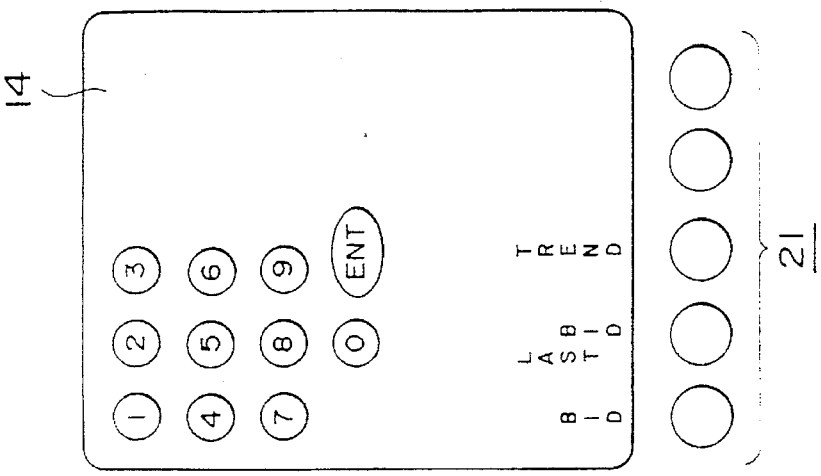
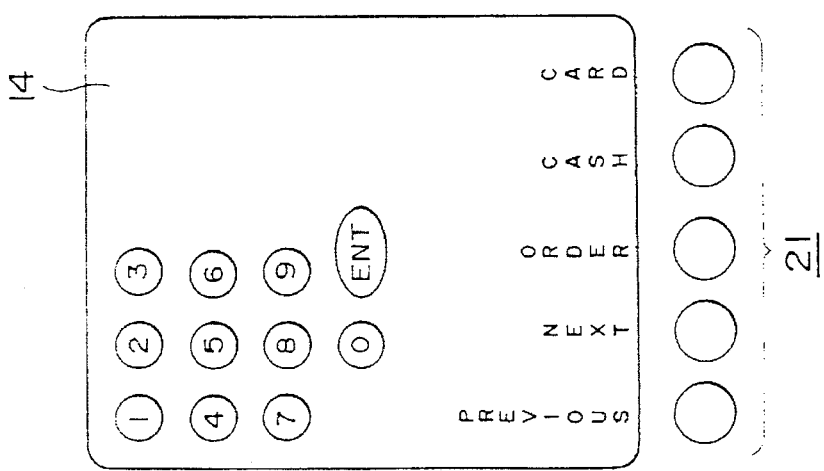
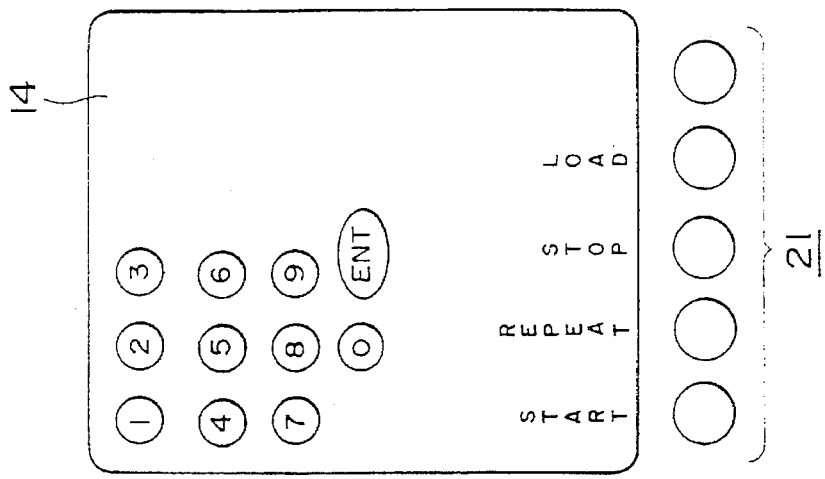

F I G. 5
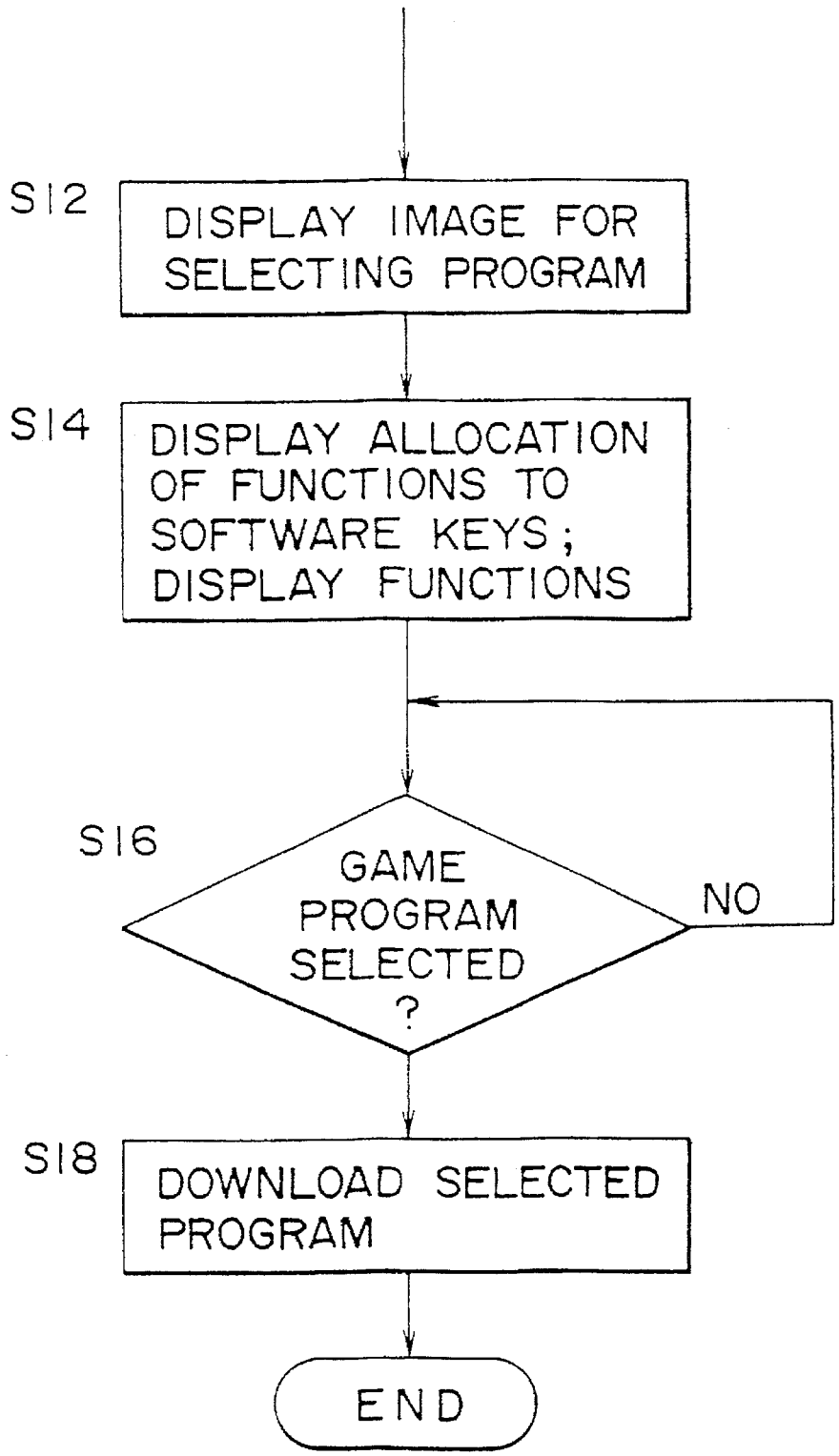

INFORMATION TERMINAL APPARATUS THAT IS REMOTELY PROGRAMMED BY RADIO WAVES AND THAT DISPLAYS INPUT KEYS OF PROGRAM FUNCTIONS ON A DISPLAY

BACKGROUND OF THE INVENTION

1. Field of the Invention

The present invention relates to an information terminal apparatus for downloading the latest application software via a network of a cable television or uploading data from a user terminal.

2. Description of the Related Art

There have been known a TV game system and a home shopping system utilizing a cable network. In a TV game system, there is adopted a method where some channels are always used for transmission of game programs to a user terminal, and desired game programs are received through the channels.

Nevertheless in a home shopping system, since the cable network supports bidirectional communication, a user is enabled to place an order merely by the use of such cable network. In the case of supporting such bidirectional communication, an order of any displayed commodity is placed by the use of a cable box remote control unit designed for ordering by means of a fixed menu or key. In another home shopping system, commodities and an item wishing to be ordered are merely displayed, and placing an order is performed via a telephone line system.

Regarding the bidirectional information terminal apparatus, there are disclosed some examples in U.S. Pat. Nos. 5,077,607 and 5,191,410, wherein check-out in a hotel or the like can be settled from a room without the necessity of going to a front desk in the hotel. In the information terminal apparatus, selected images signifying a charge, indication for check-out and so forth are visually represented on a display provided in the terminal apparatus, so that the guest can receive various services while watching the displayed images.

In the above information terminal apparatus, when employed in a TV game system for example, a predetermined channel is exclusively used for transmission of game programs, so that there exists a disadvantage of wastefully using the valuable channel. Furthermore, in any conventional network known heretofore, it is impossible to acquire desired information relative to popular software games and unpopular ones. In addition, there is another disadvantage that, in case the system is not a type for bidirectional communication, the charge cannot be billed by downloading the game.

Additionally, in the home shopping system, a user is enabled to place an order after confirming a commodity list sent from a shopping center. However, placing an order in this case is accomplished by means of a fixed menu or key in a cable box remote control unit provided on the user side, and, therefore convenience of general-purpose utility is lacking. In addition, the operational facility is inferior at the time of receiving some other services. Furthermore, in another home shopping system, an order needs to be placed via the existing telephone line system and consequently raises a problem of requiring a considerable time.

SUMMARY OF THE INVENTION

It is an object of the present invention to provide an information terminal apparatus capable of ensuring enhanced operational facility and realizing easier maintenance of software required for a variety of services.

According to one aspect of the present invention, there is provided an information terminal apparatus which comprises an external information input port for receiving external software transmitted thereto by radio means; a memory for storing the software received by the information input port; a controller operated in accordance with the software stored in the memory; a console for inputting predetermined data in conformity with the execution of the software; and a display for visually representing various information in conformity with the execution of the software.

According to another aspect of the invention, there is provided an information terminal apparatus which comprises a controller operated in accordance with predetermined software; a memory for storing various data generated by the operation of the controller; a display for visually representing various information in conformity with the operation of the controller; a console for inputting predetermined data in conformity with the execution of the software; and an external output port for transmitting the stored data in the memory to the outside by radio means.

In the present invention, external software transmitted by radio means from the outside is received by the external information input port and then is stored in the memory. The controller operates in accordance with the software stored in the memory. Subsequently, predetermined data is input from the console in compliance with the execution of the software, and various kinds of information are visually represented on the display. Therefore, any software required for individual service can be automatically interchanged, and maintenance can be carried out with facility despite any change of the software.

Furthermore, in the present invention where the controller operates in accordance with the software stored in the memory, predetermined data is input from the console in conformity with the execution of the software, then the various kinds of information are visually represented on the display, and the various data are stored in the memory. Thereafter, the data thus stored in the memory is transmitted by radio means to the outside from the external output port.

The above and other features and advantages of the present invention will become apparent from the following description which will be given with reference to the illustrative accompanying drawings.

BRIEF DESCRIPTION OF THE DRAWINGS

FIGS. 3A to 3C are exterior views showing display examples on the intelligent remote control unit in the embodiment of FIG. 1;

FIGS. 4 and 5 are flow charts for explaining the operation of an information terminal system in the embodiment of FIG. 1.

DESCRIPTION OF THE PREFERRED EMBODIMENT

Hereinafter the present invention will be described in detail with reference to a preferred embodiment thereof shown in the accompanying drawings.

Figure 1:
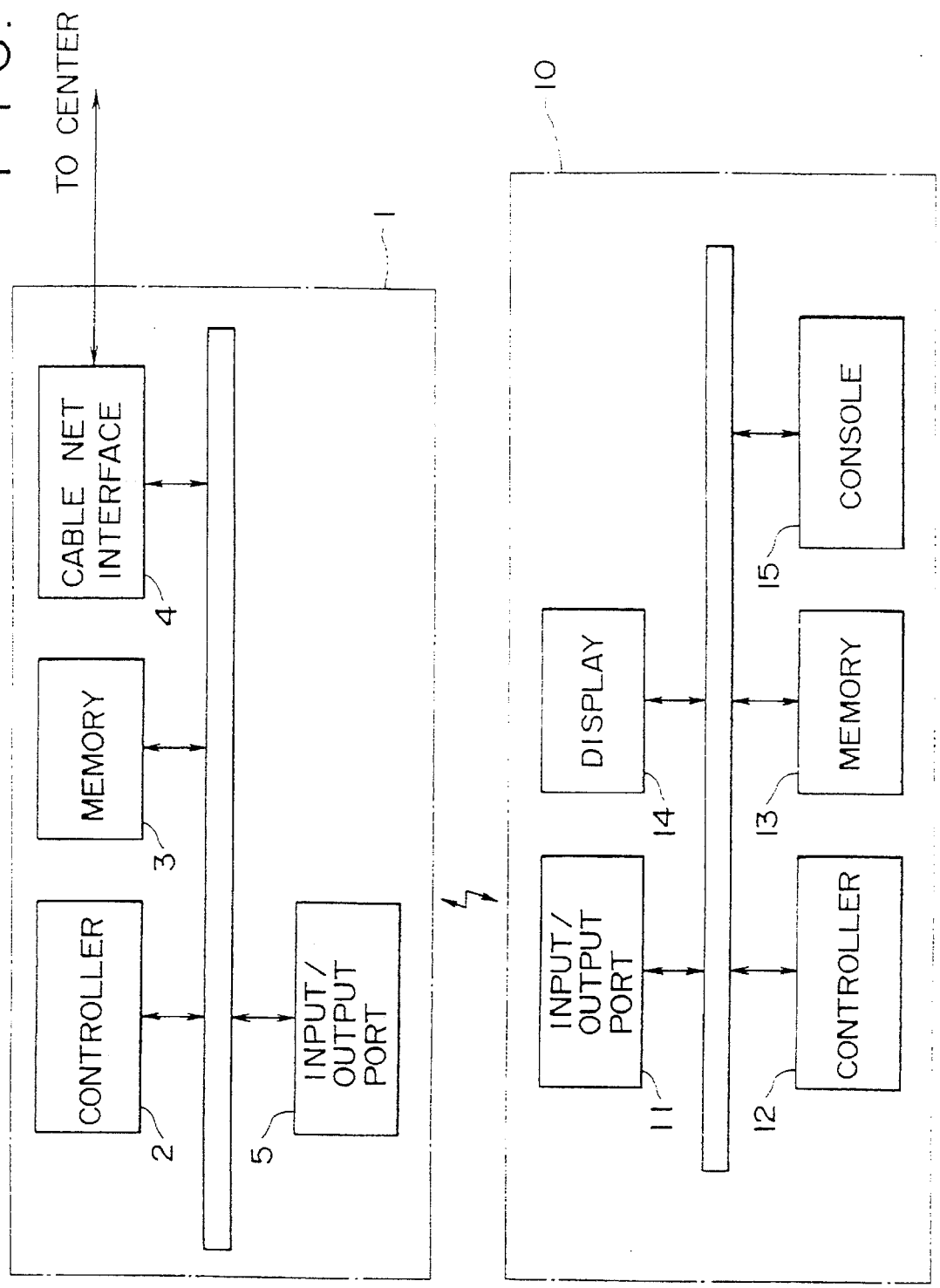
FIG. 1 is a block diagram showing the constitution of an embodiment of the present invention.

FIG. 1 is a block diagram showing the constitution of an exemplary embodiment of the invention. In this diagram, an information terminal apparatus (information transmission system) represented by this embodiment is constituted on the basis of a cable network having a bidirectional communication function. A cable box 1 is a terminal apparatus provided on a user side and consists of a controller 2, a memory 3, a cable net interface 4 and an input/output port 5. The controller 2 executes predetermined data processing and controls other component devices in accordance with a program stored in the memory 3 or a program downloaded from an unshown center. In the memory 3, a predetermined basic program is stored previously, and predetermined software downloaded from the center by an undermentioned process is also stored when necessary.

The cable net interface 4 is provided for transferring data to or from the cable network, and performs conversion or modulation of the data. In addition, the input/output port 5 transfers the data to or from an intelligent remote control unit 10.

The intelligent remote control unit 10 is a portable terminal (such as a personal digital assistant PDA or a personal intelligent communicator PIC), and transmits various commands to the cable box 1 or receives the data therefrom in accordance with a predetermined program. In this embodiment, the remote control unit is usable for downloading of game programs, and also for home shopping, home banking or in an auction system.

The intelligent remote control unit 10 consists of an input/output port 11, a controller 12, a memory 13, a display 14 and a console 15. The input/output port 11 is provided for transferring the data to or from the input/output port 5 of the cable box 1, and sends the transmission data from the controller 12 to the input/output port 5 while it supplies the reception data from the input/output port 5 to the controller 12.

The controller 12 executes predetermined data processing or control of the other components in accordance with the program stored in the memory 13 or the program downloaded from the center via the cable box 1. In the memory 13, a predetermined basic program is stored previously, and also predetermined software downloaded from the center can be stored. The display 14 has a touch panel type liquid crystal screen and displays thereon the data supplied from the controller 12. The console 15 consists of undermentioned software function keys and fixed keys, and any desired software or function can be selectively indicated by manipulating such keys.

With respect to the bandwidth in downloading and uploading, the transfer of data between the cable box 1 and the intelligent remote control unit 10 is different from the transfer of data between the cable box 1 and the cable network (cable head terminal). The transmission of information between the cable box 1 and the intelligent remote control unit 10 is performed by radio means using infrared rays, electric waves or ultrasonic waves. For the transmission of information between the cable box 1 and the intelligent remote control unit 10, bidirectional communication is possible for downloading or uploading the data and the program information. As a matter of course although not shown, a television receiver is also provided to receive the signal transmitted from the center.

Figure 2:
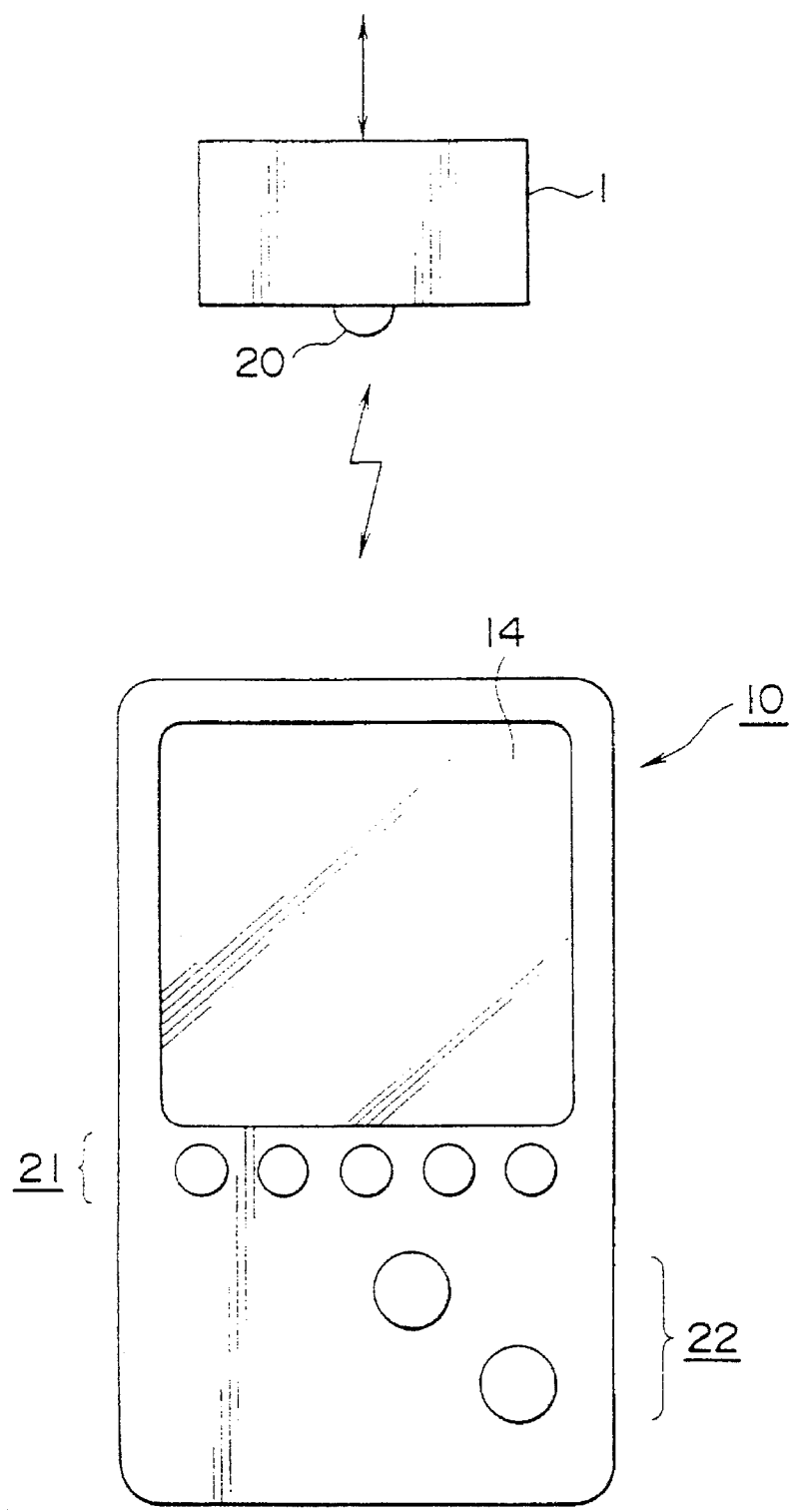
FIG. 2 is an exterior view illustrating a cable box and an intelligent remote control unit in the embodiment of FIG. 1.

FIG. 2 shows exterior views of the cable box 1 and the intelligent remote control unit 10 described above. In this diagram, the cable box 1 is equipped with a transceiver 20 for transmission and reception of information, and the transceiver 20 is incorporated in the aforementioned input/output port 5. The intelligent remote control unit 10 is so sized as to be held in a user's single hand, and comprises the display 14, software function switches 21 and fixed switches 22 of the console 15. The software function switches 21 are such that the functions thereof are settable in accordance with the software downloaded to the intelligent remote control unit 10. In contrast, in the fixed switches 22, predetermined functions are allocated.

Some display examples represented on the display 14 and the functions allocated to the software function switches 21 will now be described below with reference to FIGS. 3A–3C. FIG. 3A is an exterior view illustrating an example displayed when a game program has been downloaded. In this case, functions allocated to ten numeral keys and the software function switches 21 are visually represented on the display 14. The ten numeral keys are so provided that, when any displayed one is touched, corresponding data can be input therefrom. In addition, the software function switches 21 are so provided that any desired function represented visually on the display 14 can be input by depressing the key corresponding to that function. In this diagram, functions of "START", "REPEAT", "STOP" and "LOAD" are sequentially allocated rightward in that order. "START" is a function to indicate a start of execution of the program; "REPEAT" is a function to indicate a repetition of the operation; "STOP" is a function to indicate a stop of execution of the program; and "LOAD" is a function to indicate downloading of the selected game program.

Next, FIG. 3B is an exterior view illustrating a display example in home shopping. In this case also, functions allocated to the ten numeral keys and the software function switches 21 are visually represented on the display 14, as in the foregoing case. In this diagram, functions of "PREVIOUS", "NEXT", "ORDER", "CASH" and "CARD" are sequentially allocated rightward in that order. "PREVIOUS" is a function to indicate that the commodity displayed on the screen is replaced with an immediately preceding one; "NEXT" is a function to indicate the commodity displayed on the screen is replaced with a next one; ORDER is a function to indicate that the commodity being displayed now is ordered; "CASH" is a function to indicate that the ordered commodity is paid in cash; and "CARD" is a function to indicate that the ordered commodity is paid with a credit card.

FIG. 3C is an exterior view illustrating a display example in an auction. In this case, functions of BID, LAST BID and TREND are allocated sequentially to the software function switches 21 rightward in that order. BID is a function to indicate a bid; LAST BID is a function to indicate a last bid; and TREND is a function to indicate a call of the bidding trend.

In this manner, the functions complying with the individual services are allocated to the software function switches 21 respectively. Therefore, even though the terminal apparatus is a portable type with a small area for installation of the switches and so forth, it is still capable of meeting the requirements for various services.

Now the operation performed in the above-described constitution of the embodiment will be described below with reference to FIGS. 4 and 5. In the initialized cable box 1, the software downloaded for ordering an application program is stored in its memory. And in the intelligent remote control unit 10, other software is stored for selection of game, shopping or auction modes in accordance with the ordering software, and images for selecting the application program are visually represented on the display 14 by the other software.

Figure 4:
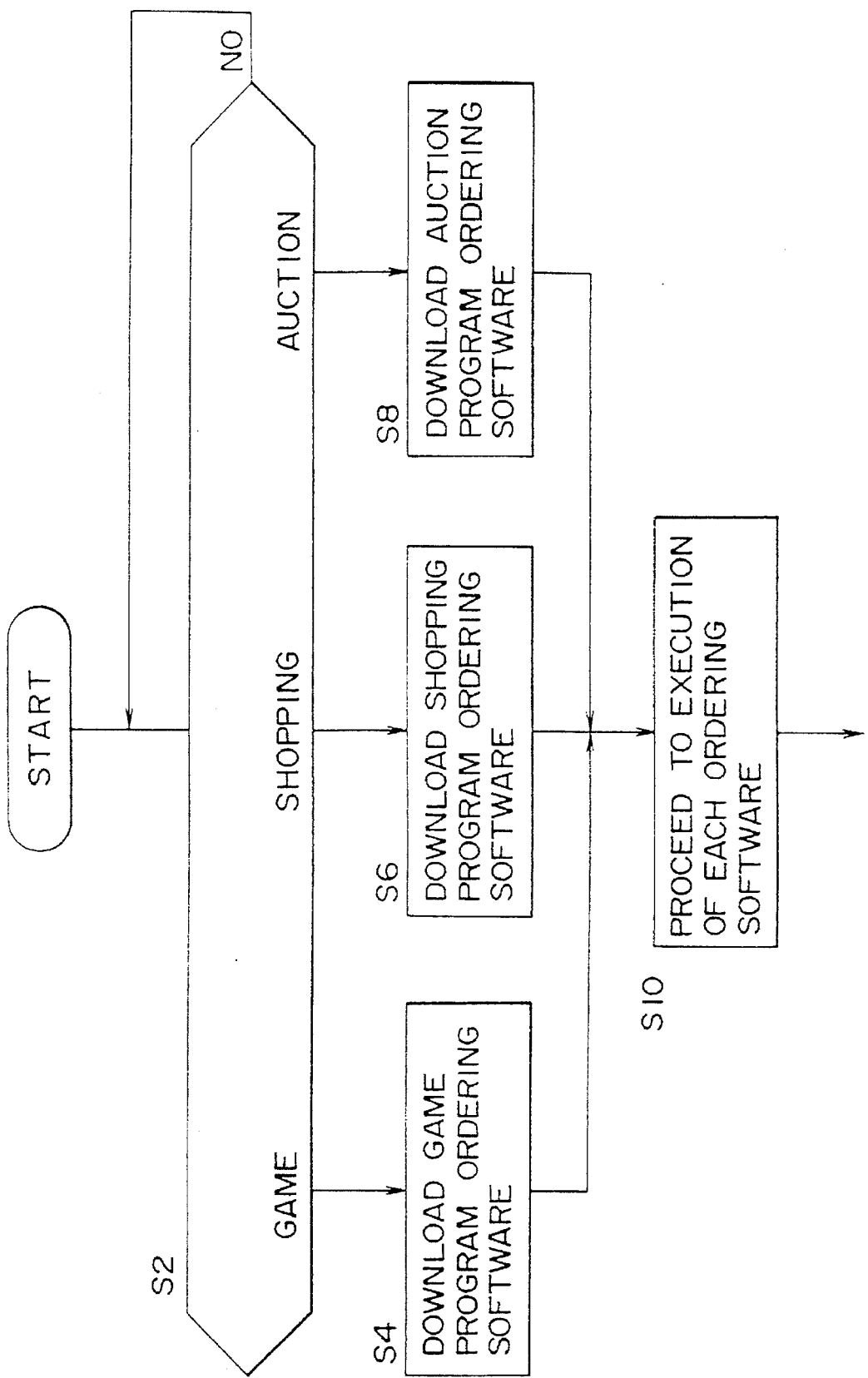

First, in the cable box 1, the procedure shown in a flow chart of FIG. 4 is executed in accordance with the ordering software. At step S2, a decision is made to determine which of the game, shopping and auction modes has been selected by the intelligent remote control unit 10. In case none has been selected, the result of such decision is NO, and step S2 is executed repeatedly. If a user desires to play a specified game, the user can select the game by manipulating the intelligent remote control unit 10.

This command is transmitted to the input/output port 5 of the cable box 1 via the input/output port 11 of the intelligent remote control unit 10. In response to this command, the cable box 1 down-loads, at step S4, the game program ordering software from the center via the cable network. The game program ordering software is then stored in the memory 3 of the cable box 1 while being transmitted via the input/output port to the intelligent remote control unit 10 to be thereby stored in the memory 13. Subsequently, in the cable box 1 and the intelligent remote control unit 10, as shown in FIG. 4, the operation proceeds to the downloaded game program ordering software at step S10.

On an unshown television screen, there are displayed a list of available game programs and respective explanations. The intelligent remote control unit 10 first displays, at step S12 in accordance with the flow chart of FIG. 4, the image of FIG. 3A on the display 14 for selecting a desired one of the available game programs. Then at step S14, allocation of functions to the software function switches 21 and the functions thereof are displayed. Thereafter, at step S16, a decision is made as to which game program has been selected, and in the case of no selection, the operation at step S16 is executed repeatedly. Subsequently, the user selects a desired game program by manipulating the touch panel and depresses the software function switch 21 to which the LOAD function is allocated. Then the result of the decision at step S16 is turned to YES, and the operation proceeds to step S18. At this step, a command for designating the selected game program and the downloading of the selected program is transmitted via the input/output port 11 to the cable box 1.

In response to this command, the cable box 1 downloads from the center the game program selected by the user. Subsequently, when the software function switch 21 corresponding to the START function is depressed, the down-loaded game program is executed by the intelligent remote control unit 10. The result of the game is uploaded via the input/output port 11 and then is stored in the cable box 1 or an unshown cable head terminal.

Since the game program is supplied practically to both the cable box 1 and the intelligent remote control unit(s) 10, the number of options of the game is increased and the number of players is not fixed. In addition, due to the use of a bidirectional cable network, one game can be played by a plurality of users in different places.

When the user has selected home shopping, the operation proceeds from step S2 to step S6. At step S6, shopping program ordering software is downloaded to the user's intelligent remote control unit 10. Any commodity ordered by the user and a method of payment (cash or card) are uploaded via the input/output port 11 to the cable box 1 and the unshown center. In this manner, the user can place an order without reserve while seeing a specified product.

In another case where the user has selected auction, the operation proceeds from step S2 to step S8 shown in FIG. 4, and an auction program is downloaded to the intelligent remote control unit 10. Then the user makes a bid through the individual intelligent remote control unit 10, and the bid is transmitted to the head terminal in the cable network. The bid speed and the highest bid price are sent back to each user, so that the user can judge the result of his bid.

Figure 6:
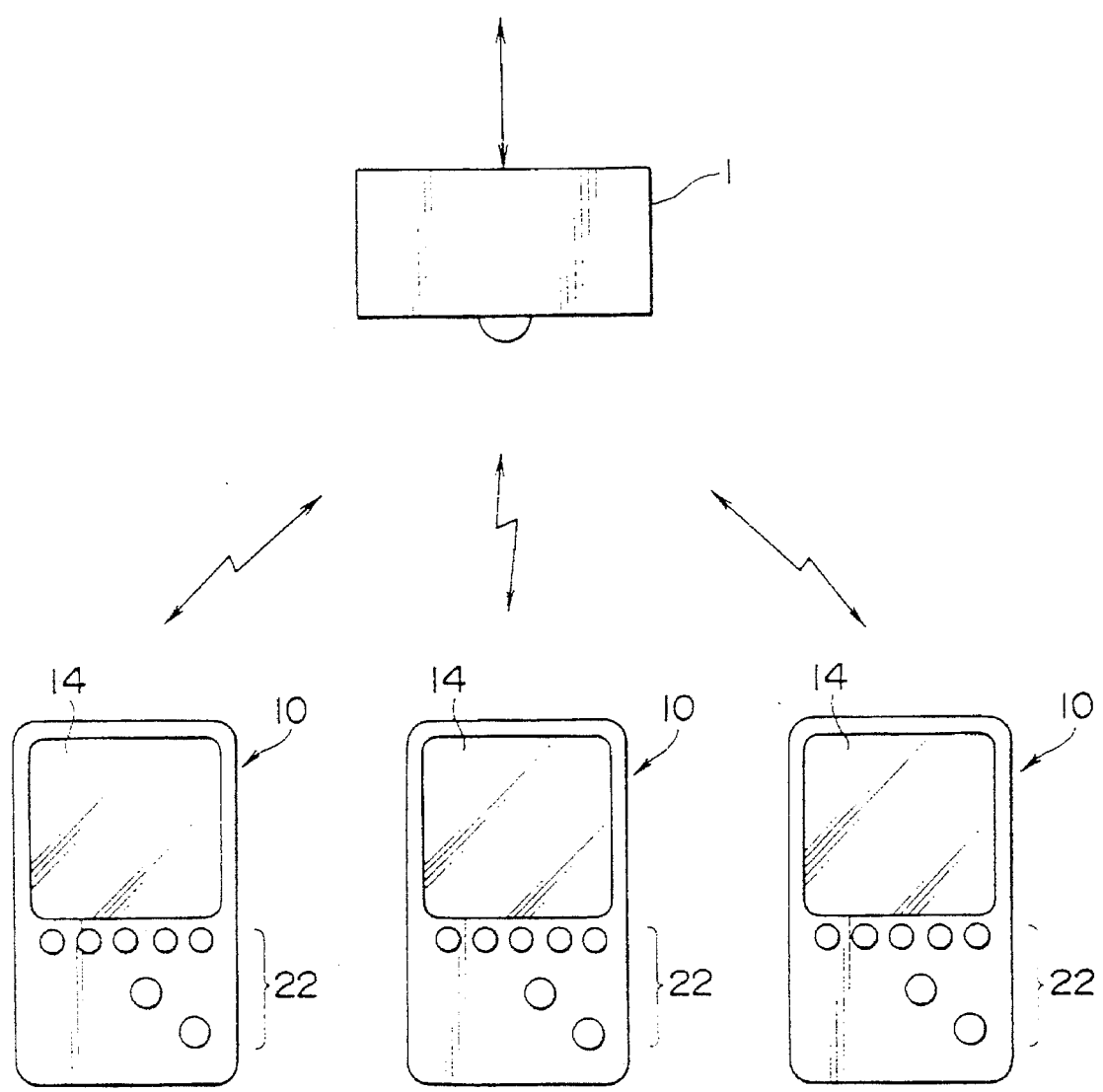
FIG. 6 is a conceptional diagram showing the constitution of a system equipped with a plurality of intelligent remote control units to one cable box by using a method relative to detection of collision and retransmission.

The above embodiment represents merely an exemplary case where the cable box and the intelligent remote control unit are disposed in a relationship of 1:1. However, the present invention is not limited to such an example alone, and it may be modified, by the technique of collision detection and retransmission, to constitute a system where a plurality of intelligent remote control units 10, 10, 10 are installed for a single cable box as shown in FIG. 6.

According to the information terminal apparatus of the present invention, as described hereinabove, it comprises an external information input port for receiving external software by radio means, a memory for storing the software received by the information input port, a controller operated in accordance with the software stored in the memory, and a display for visually representing various kinds of information in conformity with the execution of the software. Because of such constitution, the software is down-loaded every time a request is generated, so that the software can be updated in response to each request. Furthermore, maintenance of the software can be achieved with certainty as the software is distributed through a cable network. Additionally, it is rendered possible, by downloading different kinds of software, to attain another advantage of enjoying various services including games, home shopping, home banking and so forth.

In another constitution of the information terminal apparatus according to the invention, it comprises a controller operated in accordance with predetermined software, a memory for storing various data generated by the operation of the controller, a display for visually representing various kinds of information in conformity with the operation of the controller, a console for inputting predetermined data in conformity with execution of the software, and an external output port for transmitting the stored data from the memory to an external device by radio means. Consequently, there is attainable an advantage that the user's intention on the side of the information terminal apparatus can be reflected.

What is claimed is:

1. An information terminal apparatus having a cable box and an intelligent remote control unit, the intelligent remote control unit comprising:

an external information input port for receiving software transmitted thereto by radio transmission from said cable box;

a first memory for storing the software received by said external information input port;

a first controller operated in accordance with execution of the software stored in said first memory;

a console for inputting predetermined data in conformity with the execution of the software;

a display for visually representing information in conformity with the execution of the software; and the cable box comprising:
a host processor;
an interface for transferring information to and from said host processor; and
a second memory for storing the information including software transmitted thereto from said host processor, wherein said host processor includes means for controlling the information transfer between said interface, said second memory and said intelligent remote control unit, and wherein said software is a program for playing a game, and input keys corresponding to relevant program functions are visually represented on said display.

2. The information terminal apparatus according to claim 1, wherein the program function corresponding to said input keys are executed by a user manipulating a displayed portion thereof.

3. The information terminal apparatus according to claim 2, wherein said displayed portion of said input keys has a start key and a stop key, and execution of the program is started or stopped by a user selectively manipulating said keys.

4. An information terminal apparatus having a cable box and an intelligent remote control unit, the intelligent remote control unit comprising:

an external information input port for receiving software transmitted thereto by radio transmission from said cable box;

a first memory for storing the software received by said external information input port;

a first controller operated in accordance with execution of the software stored in said first memory;

a console for inputting predetermined data in conformity with the execution of the software;

a display for visually representing information in conformity with the execution of the software; and the cable box comprising:

a host processor;

an interface for transferring information to and from said host processor and a second memory for storing the information including software transmitted thereto from said host processor, wherein said host processor includes means for controlling the information transfer between said interface, said second memory and said intelligent remote control unit, wherein said software is a program for home shopping, input keys corresponding to relevant program functions are visually represented on said display, and the program functions corresponding to said input keys are executed by a user manipulating a displayed portion thereof, and wherein said displayed portion of said input keys has an order key and a payment key, and the home shopping program is executed by a user selectively manipulating said keys.

5. The information terminal apparatus according to claim 4, wherein said displayed portion of said input keys includes a plurality of numeral keys.

6. An information terminal apparatus having a cable box and an intelligent remote control unit, the intelligent remote control unit comprising:

an external information input port for receiving software transmitted thereto by radio transmission from said cable box;

a first memory for storing the software received by said external information input port;

a first controller operated in accordance with execution of the software stored in said first memory;

a console for inputting predetermined data in conformity with the execution of the software;

a display for visually representing information in conformity with the execution of the software; and the cable box comprising:

a host processor;

an interface for transferring information to and from said host processor; and a second memory for storing the information including software transmitted thereto from said host processor, wherein said host processor includes means for controlling the information transfer between said interface, said second memory and said intelligent remote control unit, and wherein said software is a program for auction participation, and input keys corresponding to relevant program functions are visually represented on said display.

7. The information terminal apparatus according to claim 6, wherein the program function corresponding to said input keys are executed by a user manipulating a displayed portion thereof.

8. The information terminal apparatus according to claim 7, wherein said displayed portion of said input keys has an order key and a payment key, and the auction participation program is executed by a user selectively manipulating said keys.

9. The information terminal apparatus according to claim 8, wherein said displayed portion of said input keys includes a plurality of numeral keys.

* * * * *

UNITED STATES PATENT AND TRADEMARK OFFICE
CERTIFICATE OF CORRECTION

PATENT NO. : 5,668,591
DATED : September 16, 1997
INVENTOR(S) : Peter Shintani

It is certified that error appears in the above-identified patent and that said Letters Patent is hereby corrected as shown below:

Col.7, line 30, after "processor" insert --;--

Signed and Sealed this

Twentieth Day of October, 1998

Attest:

BRUCE LEHMAN

*Attesting Officer*    *Commissioner of Patents and Trademarks*